(12) United States Patent
Cuende et al.

(10) Patent No.: US 9,960,920 B2
(45) Date of Patent: *May 1, 2018

(54) SYSTEMS AND METHODS FOR CERTIFICATION OF DATA UNITS AND/OR CERTIFICATION VERIFICATION

(71) Applicant: STAMPERY INC., San Francisco, CA (US)

(72) Inventors: Luis Iván Cuende, Madrid (ES); Adán Sánchez de Pedro Crespo, Madrid (ES)

(73) Assignee: STAMPERY INC., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/594,364

(22) Filed: May 12, 2017

(65) Prior Publication Data

US 2017/0250815 A1    Aug. 31, 2017

Related U.S. Application Data

(63) Continuation-in-part of application No. 15/007,120, filed on Jan. 26, 2016, now Pat. No. 9,679,276.

(51) Int. Cl.
*H04L 29/00*  (2006.01)
*H04L 9/32*   (2006.01)
*G06Q 20/06*  (2012.01)

(52) U.S. Cl.
CPC ......... *H04L 9/3236* (2013.01); *G06Q 20/065* (2013.01)

(58) Field of Classification Search
CPC ... H04L 9/3247; H04L 63/0442; H04L 63/08; H04L 9/0861; H04L 63/0876; H04L 63/12; H04L 63/0823
See application file for complete search history.

(56) References Cited

U.S. PATENT DOCUMENTS

| 4,309,569 A † | 1/1982 | Merkle |
| 7,904,450 B2 † | 3/2011 | Wilson |
| 8,135,714 B2 | 3/2012 | Wilson |

(Continued)

OTHER PUBLICATIONS

Vaughan et al.; "Chainpoint, A scalable protocol for recording data in the blockchain and generating blockchain receipts," v1.0, Jul. 22, 2015; 6 pages.

*Primary Examiner* — Ghazal Shehni
(74) *Attorney, Agent, or Firm* — Pillsbury Winthrop Shaw Pittman, LLP (57) ABSTRACT

In some implementations, a data unit may be hashed to generate a hash. A cryptographic structure, such as a Merkle tree or other cryptographic structure, maybe generated based on the hash and published on a block chain or distributed ledger. A proof associated with the data unit may be provided. The proof may allow for independent verification that the data unit is certified. Responsive to obtaining the data unit as at least one data unit to be verified, the data unit may be hashed. The associated proof may be obtained, where the obtained proof includes an index describing a position of the hash among one or more other hashes in the published cryptographic structure. The cryptographic structure may be reconstructed based on the index of the proof. Certification of the data unit may be verified by proving that the hash belongs to a root of the published cryptographic structure.

20 Claims, 5 Drawing Sheets (56) References Cited

U.S. PATENT DOCUMENTS

| | | |
|---|---|---|
| 8,903,839 B2 | 12/2014 | Wilson |
| 9,053,142 B2 | 6/2015 | Wilson |
| 9,330,261 B2 | 5/2016 | Wilson |
| 2006/0136728 A1 | 6/2006 | Gentry |
| 2009/0100041 A1 | 4/2009 | Wilson |
| 2011/0125718 A1 | 5/2011 | Wilson |
| 2012/0197901 A1 | 8/2012 | Wilson |
| 2013/0282678 A1 | 10/2013 | Wilson |
| 2015/0254459 A1 | 9/2015 | Wilson |
| 2016/0212146 A1 | 7/2016 | Wilson |

† cited by third party

SYSTEMS AND METHODS FOR CERTIFICATION OF DATA UNITS AND/OR CERTIFICATION VERIFICATION

CROSS-REFERENCE TO RELATED APPLICATIONS

This application is a continuation-in-part of U.S. patent application Ser. No. 15/007,120, filed Jan. 26, 2016, now allowed, the entire contents of which are hereby incorporated by reference.

FIELD OF THE DISCLOSURE

This disclosure relates to systems and methods for facilitating certification of data units and/or verification of such certifications of the data units.

BACKGROUND

Electronic notarization systems are known. Existing systems use a digital signature and digital notary seal to notarize digital documents. The documents are validated with a digital certificate. The digital signature and/or notary seal are coupled with an electronic document using a secure public key. Cryptography and public key infrastructure are used to create, manage, distribute, use, store, and revoke digital certificates. Electronic notary transactions must be manually kept in a register describing each notarization.

SUMMARY

One aspect of the disclosure may relate to a system for facilitating certification of data units and/or verification of such certifications of the data units. In some implementations, the system may enable users to certify the existence, integrity, and/or ownership of any file or communication using a block chain or distributed ledger (e.g., Bitcoin block chain, Ethereum block chain, or other block chain or distributed ledger). The block chain or distributed ledger may be a ledger distributed among tens of thousands of computers around the world that may be accessed at any time by any user at no cost, but limits the amount of data that may be embedded into the ledger. With respect to the Bitcoin block chain, for example, the present system may utilize its distributed nature to enhance security of existence, integrity, and/or ownership certifications, and may facilitate certification for a virtually unlimited number of files or communications within the data limits of the Bitcoin block chain. In some implementations, the present system may be used to notarize digital transactions to generate audit trails, establish ownership of digital assets, and/or for other uses.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION

Figure 1:
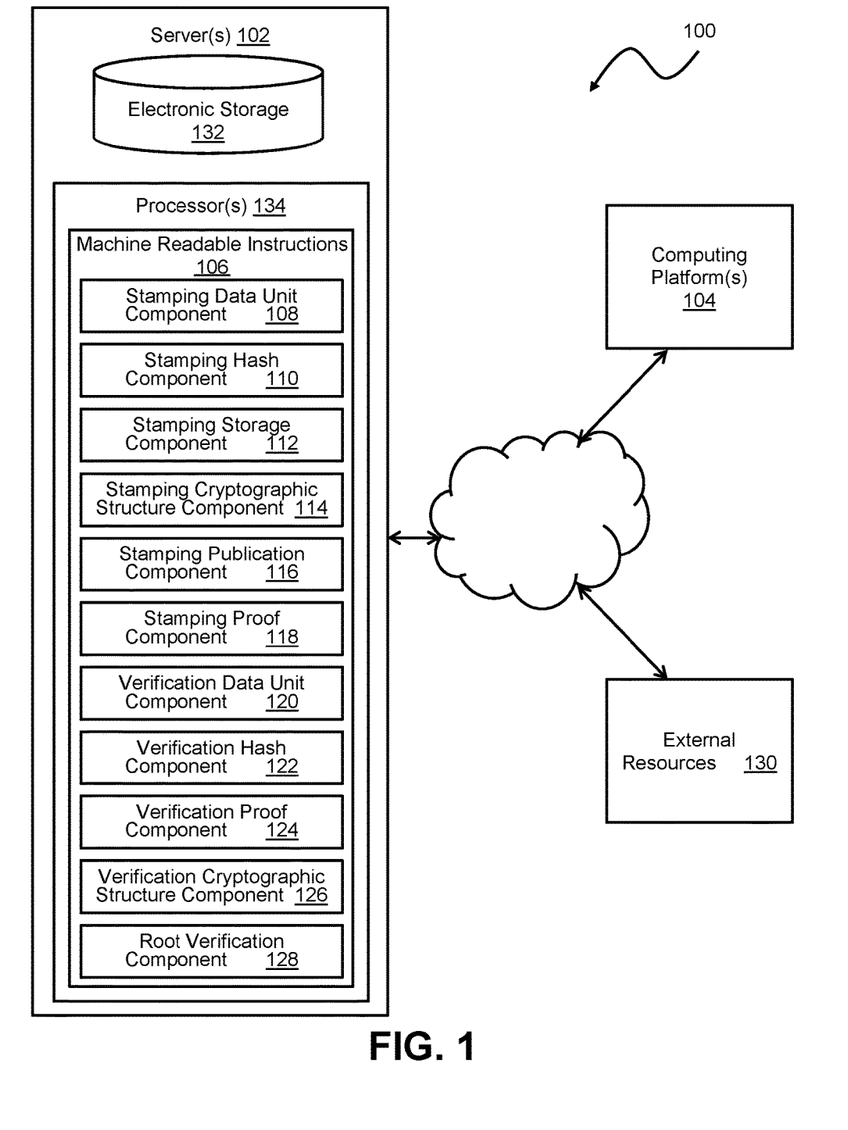
FIG. 1 illustrates a system configured for using a block chain to certify the existence, integrity, and/or ownership of a file or communication, in accordance with one or more implementations.

FIG. 1 illustrates a system 100 for using a block chain to certify the existence, integrity, and/or ownership of a file or communication, in accordance with one or more implementations. In some implementations, system 100 may include one or more servers 102. The server(s) 102 may be configured to communicate with one or more computing platforms 104 according to client/server architecture, a peer-to-peer architecture, and/or other architectures. The users may access system 100 via computing platform(s) 104.

The server(s) 102 may be configured to execute machine-readable instructions 106. The machine-readable instructions may facilitate stamping data units such as files, communications, and/or other data units to provide certification; verification of the certification of the data units; and/or other operations. The machine-readable instructions 106 may include one or more of a stamping data unit component 108, a stamping hash component 110, a stamping storage component 112, a stamping cryptographic structure component 114, a stamping publication component 116, a stamping proof component 118, a verification data unit component 120, a verification hash component 122, a verification proof component 124, a verification cryptographic structure component 126, a root verification component 128, and/or other machine-readable instruction components.

The machine-readable instructions 106 may be executable to use a block chain or distributed ledger to certify the existence, integrity, and/or ownership of a file or communication. Generally speaking, a block chain or distributed ledger may include a transaction database shared by some or all nodes participating in system 100. Such participation may be based on the Bitcoin protocol, the Ethereum protocol, and/or other protocols related to digital currencies and/or block chain or distributed ledgers. A full copy of the block chain or distributed ledger may contain every transaction ever executed in an associated digital currency. In addition to transactions, other information may be contained by the block chain or distributed ledger, such as described further herein. In some implementations, the block chain or distributed ledger may be a private block chain, a private distribute ledger, a public block chain, a public distributed ledger, or other block chain or distributed ledger. In some implementations, the block chain or distributed ledger may be based on a digital token or digital token technology.

The block chain or distributed ledger may be based on several blocks. A block may include a record that contains and confirms one or more waiting transactions. Periodically (e.g., roughly every ten minutes), a new block including transactions and/or other information may be appended to the block chain or distributed ledger. In some implementations, a given block in the block chain or distributed ledger may contain a hash of the previous block. This may have the effect of creating a chain of blocks from a genesis block (i.e., the first block in the block chain or distributed ledger) to a current block. The given block may be guaranteed to come chronologically after a previous block because the previous block's hash would otherwise not be known. The given block may be computationally impractical to modify once it is included in the block chain or distributed ledger because every block after it would also have to be regenerated.

In some implementations, stamping data unit component 108, stamping hash component 110, stamping storage component 112, stamping cryptographic structure component 114, stamping publication component 116, stamping proof component 118, and/or other components may facilitate stamping data units such as files and/or communications to provide certification. In some implementations, stamping data units may include receiving data units, hashing the data units, generating a cryptographic structure based on the hashed data units, publishing the cryptographic structure on the block chain or distributed ledger, and/or other operations as described below.

Stamping data unit component 108 may be configured to receive a plurality of data units. The data units may include electronic files, electronic communications, electronic documents, electronic pictures, electronic contracts, and/or other data units. In some implementations, stamping data unit component 108 may be configured to receive the plurality of data units via an application program interface (API) and/or other interfaces associated with system 100 that facilitates entry and/or selection of the data units and/or other information by a user. The API may be run on computing platform(s) 104 and/or other computing platforms. In some implementations, the API may facilitate entry and/or selection of the data units via one or more views and/or fields of a graphical user interface (GUI) displayed on computing platform(s) 104 and/or other computing devices. Entry and/or selection of the data units by a user may include dragging and dropping files from field to field of the GUI (e.g., by clicking and dragging files with a mouse, touching and moving files with a touch sensitive interface, etc.), sending emails, uploading information from a storage device, using Dropbox and/or other enterprise software integrated with system 100 to enter and/or select data units, communicating a data payload to the API using a chat application and/or instant messaging application, and/or otherwise communicating other data payloads to the API. By way of a non-limiting example, a user may drag and drop files (e.g., a plurality of data units) into a data unit receipt field of a GUI running on computing platform(s) 104. The plurality of data units may include a first data unit (e.g., an email) among the plurality of units. In this example, stamping data unit component 108 may receive the first data unit and the rest of the plurality of data units from the API via the data unit receipt field.

In some implementations, the plurality of data units may be received during one or more individual timeframes. The individual timeframes may correspond to periods of time between trigger events and/or other periods of time. A trigger event may include expiration of predetermined period of time (e.g., 10 minutes), creation of a new block in connection with the block chain or distributed ledger (e.g., an individual timeframe may correspond to a period of time between when a previous block has been added to the block chain or distributed ledger and when the next subsequent block has not yet been added), receipt of a predetermined number of data units, and/or other events. For example, the one or more individual timeframes may be and/or include a predetermined period of 10 minutes. As another example, the one or more individual timeframes may include a first timeframe that corresponds to a period of time after an $n^{th}$ block has been added to the block chain or distributed ledger but before an $n^{th}+1$ block is added to the block chain or distributed ledger. As a further example, the one or more individual time frames may include an amount of time required to receive 1 billion data units. In some implementations, any number of data units may be received during the one or more individual timeframes. Using the example trigger events described above, any number of data units may be received in the 10 minute period, any number of data units may be received during the period of time before a new block is added to the block chain or distributed ledger, and/or the predetermined trigger number of received data units may be set to any value. In some implementations, the number of data units received may be limited only by the speed with which data units are provided to system 100 by users and/or the capabilities of current processing and storage components included in server(s) 102, computing platform(s) 104, and/or other components of system 100. In some implementations, stamping data unit component 108 is configured to receive any number of data units (e.g., one data unit, two data units, hundreds of data units, thousands of data units, millions of data units, billions of data units, etc.) during a single individual time frame.

Stamping hash component 110 may be configured to hash individual ones of the plurality of data units. The individual ones of the plurality of data units may be hashed with one or more hash algorithms to provide a plurality of hashes. The plurality of hashes may be unique cryptographic identifiers of the corresponding data units. The individual hashes may verifiably relate to their corresponding data units. However, the individual hashes may not be used by themselves to obtain their corresponding data units. For example, the first data unit may be hashed using a first hash algorithm to provide a first hash. The first hash may be a unique cryptographic identifier of the first data unit such that the first hash verifiably relates to the first data unit and the first hash cannot be used by itself to obtain the first data unit.

Stamping storage component 112 may be configured to temporarily store the plurality of hashes. The plurality of hashes may be stored until occurrence of a trigger event and/or for other periods of time. As described above, a trigger event may include expiration of a predetermined period of time (e.g., 10 minutes), creation of a new block in connection with the block chain or distributed ledger, receipt of a predetermined number of data units, and/or other events. In some implementations, stamping storage component 112 may be configured to temporarily store the plurality of hashes for the individual timeframes described above related to stamping data unit component 108. In some implementations, the plurality of hashes may be stored on server(s) 102 and/or in other locations. By way of a non-limiting example, stamping storage component 112 may be configured to store the first hash for 10 minutes. As another example, stamping storage component 112 may be configured to store the first hash during a period of time after the $n^{th}$ block has been added to the block chain or distributed ledger until the $n^{th}+1$ block is added to the block chain or distributed ledger. As a further example, stamping storage component 112 may be configured to store the first hash with other hashes until 1 billion data units (e.g., a predetermined trigger number of data units) are received.

Stamping cryptographic structure component 114 may be configured to, responsive to occurrence of a trigger event, generate a cryptographic structure. The cryptographic structure may be generated based on the plurality of hashes and/or other information. In some implementations, the cryptographic structure may include a Merkle tree, a Patricia tree, a Tiger hash tree, and/or other cryptographic structures. In some implementations, the cryptographic structure may be associated with any number of data units (e.g., one data unit, two data units, hundreds of data units, thousands of data units, millions of data units, billions of data units, etc.) and a corresponding number of hashes. For example, the cryptographic structure may be associated with billions of data units received, hashed, and stored during a single individual timeframe. In some implementations, generating the cryptographic structure based on the plurality of hashes may comprise hashing the plurality of hashes until a single hash that is a hash of the plurality of hashes is generated. In this way, any number of data units (e.g., one data unit, two data units, hundreds of data units, thousands of data units, millions of data units, billions of data units, etc.) may be represented by a single hash. Hashing a data structure may be a process that takes in a given data set and returns a unique output that may be unidirectionally and/or uniquely related to the given data set. The hash, which is the output, may not allow a user to obtain the inputted data, but the inputted data may allow the user to obtain its hash.

This may be advantageous because the Bitcoin protocol limits the number of transactions per block, which in turn limits the transactions per unit time that may be recorded in the block chain or distributed ledger. For example, a maximum of 80 bytes of data (as described below) may be added to each new block of the Bitcoin block chain. System 100 overcomes this Bitcoin limitation because any number of data units may be recorded by stamping cryptographic structure component 114 via a single hash. The single hash may comprise 80 or less bytes of data such that the single hash may be stored in the Bitcoin block chain.

Figure 2:
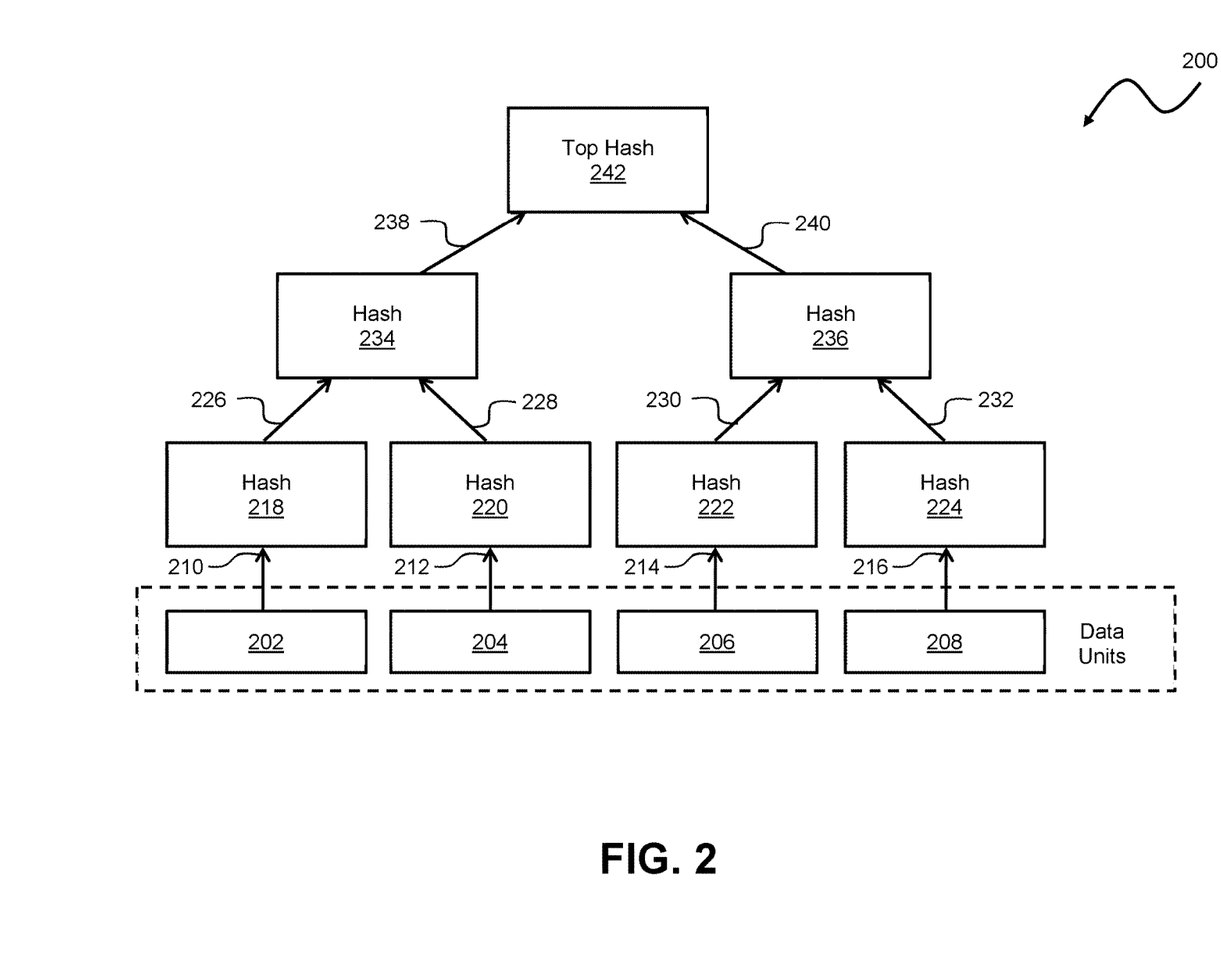
FIG. 2 illustrates a cryptographic structure, in accordance with one or more implementations.

By way of a non-limiting example, FIG. 2 illustrates a cryptographic structure 200, in accordance with one or more implementations. Cryptographic structure 200 may be generated by stamping cryptographic structure component 114 (FIG. 1). Cryptographic structure 200 may include a Merkle tree, a Patricia tree, a Tiger hash tree, or other cryptographic structure. As shown in FIG. 2, data units 202, 204, 206, and 208 may be hashed 210, 212, 214, and 216 to produce hashes 218, 220, 222, and 224. Hash 218 may correspond to data unit 202. Hash 220 may correspond to data unit 204. Hash 222 may correspond to data unit 206. Hash 224 may correspond to data unit 208. Next, hashes 218, 220, 222, and 224 may be hashed 226, 228, 230, 232 to form hashes 234 and 236. Hash 234 may correspond to hashes 218 and 220. Hash 236 may correspond to hash 222 and 224. Finally, hashes 234 and 236 may be hashed 238, 240 to form a top hash 242. Top hash 242 may be a single hash that represents data blocks 202, 204, 206, and 208, and the intermediary hashes 218, 220, 222, 224, 234, and 236. It should be noted that the number of data blocks and hashes shown in FIG. 2 is not intended to be limiting. As described above, the process of hashing hashes may be used to generate a tree (or other structure) large enough to represent any number (e.g., one data unit, two data units, tens of data units, hundreds of data units, thousands of data units, millions of data units, billions of data units, etc.) of data units with a single top hash as described herein.

Returning to FIG. 1, stamping publication component 116 may be configured to publish the cryptographic structure on the block chain or distributed ledger. In some implementations, publishing the cryptographic structure on the block chain or distributed ledger may comprise publishing the single hash that is a hash of the plurality of hashes (e.g., top hash 242 shown in FIG. 2) on the block chain or distributed ledger. In some implementations, the single hash that is a hash of the plurality of hashes may comprise up to about 80 bytes of data. (It should be noted that the description of up to about 80 bytes of data is not intended to be limiting. The single hash may comprise any amount of data that allows it to be published to a block chain or distributed ledger using a given block chain or distributed ledger protocol.) Publishing the single hash on the block chain or distributed ledger may comprise embedding the up to about 80 bytes of data into a new block of the block chain or distributed ledger. In some implementations, the single hash is published on the block chain or distributed ledger using an OP_RETURN feature and/or other features of Bitcoin. The OP_RETURN feature of Bitcoin may be a Bitcoin opcode that facilitates storage of up to about 80 bytes of data in the Bitcoin block chain. The OP_RETURN feature may facilitate association of extra data with a transaction that is secured by the block chain. The OP_RETURN feature may limit the association of extra data to 80 bytes to prevent an unlimited amount of information from being stored in the block chain and maintain Bitcoin system performance. In some implementations, the single hash is published on a Ethereum block chain via the data field feature of Ethereum, the contract creation feature of Ethereum, or other feature of Ethereum.

In some implementations, stamping data unit component 108, stamping hash component 110, stamping storage component 112, stamping cryptographic structure component 114, stamping publication component 116, and/or other components may facilitate stamping data units to provide certification in an amount of time that may be and/or correspond to the periods of time between trigger events (e.g., expiration of predetermined period of time, creation of a new block in connection with the block chain or distributed ledger, receipt of a predetermined number of data units, and/or other events) and/or other periods of time. For example, stamping data units to provide certification may occur every 10 minutes, during the period of time between the $n^{th}$ block and the $n^{th}+1$ block being added to the block chain or distributed ledger (e.g., the next "mined" block) which may be about ten minutes based on the current performance of Bitcoin, in an amount of time that corresponds to the receipt of a predetermined number of data units, and/or in other amounts of time. It should be noted that the present disclosure contemplates other periods of time more and/or less than ten minutes. For example, the predetermined period of time may be set to something other than 10 minutes. The period of time between the $n^{th}$ block and the $n^{th}+1$ block being added to the block chain or distributed ledger may increase and/or decrease relative to the ten minute example given above because of changes in the performance of Bitcoin, use of a different block chain (e.g., an Ethereum block chain), and/or other factors. In some implementations, the period of time for stamping data units to provide certification may be up to about one minute. In some implementations, the period of time for stamping data units to provide certification may be up to about fifteen minutes. In some implementations, the period of time for stamping data units to provide certification may be between about one minute and about fifteen minutes.

Stamping proof component 118 may be configured to provide proofs associated with individual ones of the plurality of data units. Proofs associated with individual ones of the plurality of data units may include proofs associated with cryptographic structures representative of a plurality of hashes, a plurality of data units, and/or other information. An individual proof may include information needed for a user to verify that an individual data unit has been certified. In some implementations, an individual proof may include the name of the data unit certified, a date and/or time of certification, a notary signee name and/or email address from a person and/or entity associated with certifying the data unit, hashing method information (e.g., hashing algorithm), information related to a position of the data unit in a Merkle tree (e.g., Merkle index, Merkle root information, etc.), a transaction identification, a version number, a web certification certificate, a PDF certification certificate, a JSON proof, a URL certified data unit sharing address, signatures related to cryptographic identities, and/or other information. In some implementations, a proof may include a Bitcoin transaction identification in which a root of a cryptographic structure is published. The Merkle index and/or root information may describe a position of a hash among other hashes in a cryptographic structure published on the block chain or distributed ledger, and/or other information. By way of a non-limiting example, the proofs may include a first proof associated with the first data unit. The first proof may allow independent verification that the first data unit is certified.

In some implementations, verification data unit 120, verification hash component 122, verification proof component 124, verification cryptographic structure component 126, root verification component 128, and/or other components may facilitate verification of the certification of the data units. Verification data unit 120, verification hash component 122, verification proof component 124, verification cryptographic structure component 126, root verification component 128, and/or other components may be configured (as described below) such that certifications of data units may be verified independently from the certification process (described above).

Verification data unit component 120 may be configured to obtain one or more data units to be verified. Verification data unit component 120 may be configured to obtain the one or more data units to be verified via, for example, the GUI running on computing platform(s) 104, and/or via other computing platforms associated with other users. In some implementations, verification data unit component 120 may be configured to obtain one or more data units to be verified responsive to a user dragging and dropping files from field to field of the GUI, sending emails, uploading information from a storage device, using Dropbox and/or other enterprise software integrated with system 100 to enter and/or select data units, communicating data units via a chat application and/or instant messaging application, and/or otherwise communicating other data payloads to verification data unit component 120. For example, the one or more data units to be verified may include the first data unit and/or other data units uploaded to system 100 from a storage device by a user via computing platform(s) 104.

Verification hash component 122 may be configured to hash the one or more obtained data units. Verification hash component 122 may be configured to hash the one or more obtained data units using the same hash algorithm used to create the one or more proofs. As described above, the one or more proofs may include hashing method information such as the hashing algorithms used to hash individual data components. Verification hash component 122 may be configured to obtain the same hash algorithm used to create the one or more proofs from the one or more proofs themselves. For example, the first data unit may be hashed for verification using the first hash algorithm used during stamping. The first hash algorithm may be obtained from the first proof.

Verification proof component 124 may be configured to obtain one or more proofs corresponding to the one or more data units. As described above, an individual proof may include the name of the data unit certified, a date and/or time of certification, a notary signee name and/or email address from a person and/or entity associated with certifying the data unit, hashing method information (e.g., hashing algorithm), information related to a position of the data unit in a Merkle tree (e.g., Merkle index, Merkle root information, etc.), a transaction identification, a version number, a web certification certificate, a PDF certification certificate, a JSON proof, a URL certified data unit sharing address, and/or other information. The Merkle index and/or root information in the proof may describe positions of hashes among other hashes in a Merkle tree, and/or other information. By way of a non-limiting example, the one or more proofs may include the first proof corresponding to the first data unit. The first proof may include an index describing a position of the first hash among other hashes in the first cryptographic structure (e.g., Merkle tree, Patricia tree, Tiger hash tree, etc.) published on the block chain or distributed ledger and/or other information.

Verification cryptographic structure component 126 may be configured to reconstruct cryptographic structures. The cryptographic structures may be reconstructed based on the information in the one or more proofs and/or other information. In some implementations, verification cryptographic structure component 126 may be configured to reconstruct a cryptographic structure based on an index for the cryptographic structure included in a proof associated with the data unit whose certification is being verified and/or based on other information. As described above, the index may describe positions of individual hashes relative to each other in the cryptographic structure and/or other components of the cryptographic structure. In some implementations, reconstructing cryptographic structures based on the one or more proofs may comprise reconstructing Merkle trees, Patricia trees, Tiger hash trees, or other cryptographic structures. The reconstructed trees/structures may describe the positions of individual hashes among other hashes in a given tree/structure. For example, continuing with the example above, the first cryptographic structure may be a Merkle tree, a Patricia tree, a Tiger hash tree, or other cryptographic structure. The tree/structure may be reconstructed based on the index of the first proof. In some implementations, the first proof may list the relative positions of the other hashes and the first hash in the tree/structure. The relative positions of the other hashes and the first hash may be used to reconstruct the tree/structure.

Root verification component 128 may be configured to verify certification by proving that hashes belong to roots of the reconstructed cryptographic structures. Proving that hashes belong to roots of the reconstructed cryptographic structures may include proving that verification hashes (e.g., hashes performed by verification hash component 122) belong to roots of the reconstructed cryptographic structures. Root verification component 128 may verify certification of data units by identifying an expected location of one or more hashes for one or more data units in one or more roots of a Merkle tree, a Patricia tree, a Tiger hash tree, or other cryptographic structure. The expected locations for the one or more hashes may be the locations of the hashes described by the index of a proof corresponding to the data units being verified. Root verification component 128 may be configured to verify certification of a data unit by comparing a position of a verification hash of a data unit relative to positions of other hashes in the reconstructed tree. Root verification component 128 may be configured to verify certification of a data unit responsive to a hash of hashes using a verification hash of the data unit in its expected position in a reconstructed tree matching a root of the reconstructed tree described in the proof. For example, certification of the first data unit may be verified by proving that a verification hash of the first data unit belongs to a root of the first cryptographic structure by comparing the verification hash of the first data unit (e.g., performed by verification hash component 122 described above) to the position of the first hash (e.g., hashed during stamping by stamping hash component 110 described above) in the first cryptographic structure (e.g., Merkle tree, Patricia tree, Tiger hash tree, etc.). If a hash of hashes using the verification hash produces a root of the tree described in the proof (e.g., via the index), root verification component 128 may verify the certification of the corresponding data unit. If a hash of hashes using the verification hash does not produce a root of the tree described in the proof, root verification component 128 may not verify the certification of the corresponding data unit.

Figure 3:
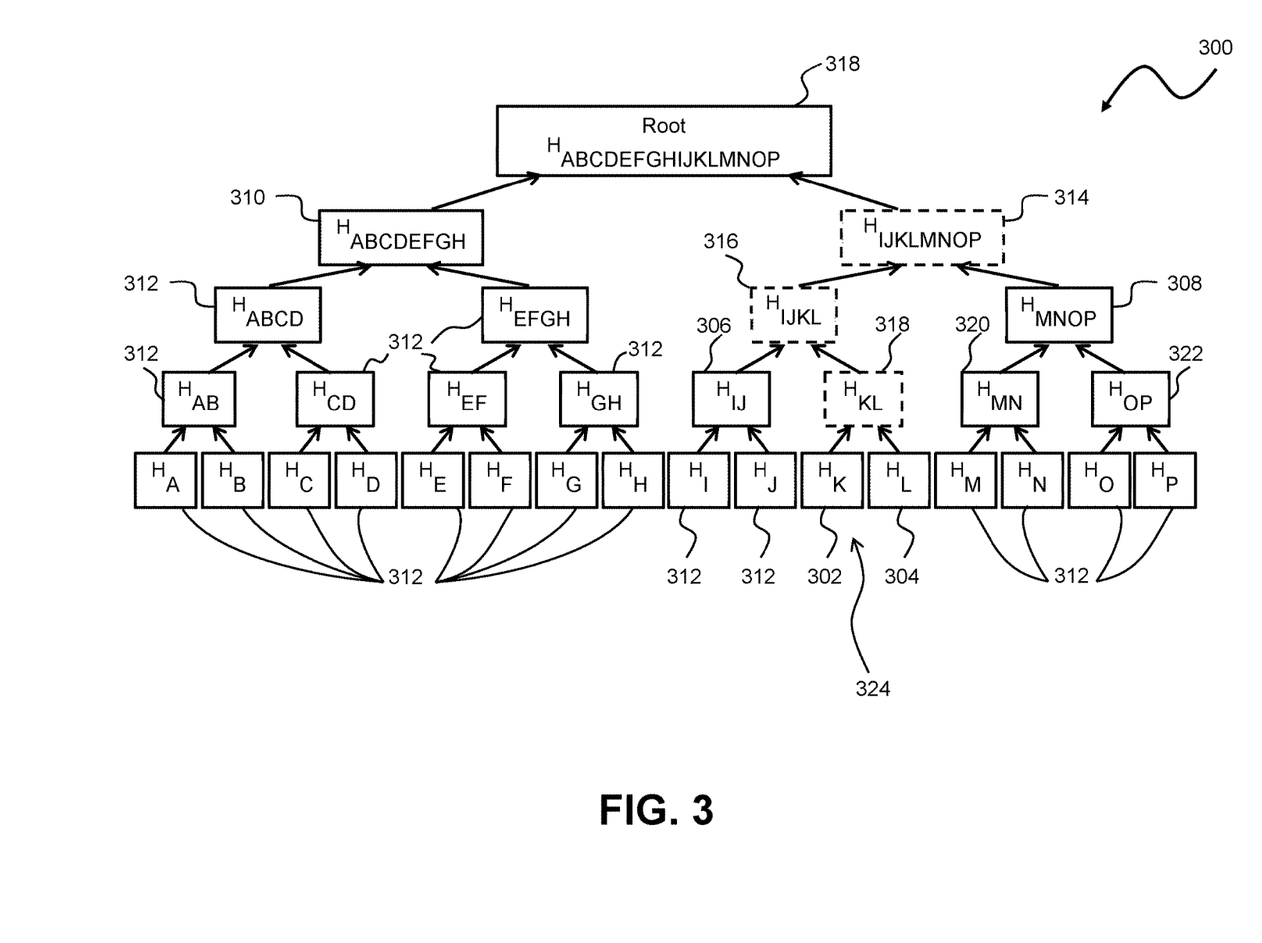
FIG. 3 illustrates a reconstructed cryptographic structure, in accordance with one or more implementations.

By way of a non-limiting example, FIG. 3 illustrates a reconstructed cryptographic structure 300, in accordance with one or more implementations. Reconstructed cryptographic structure 300 may include a reconstructed Merkle tree, Patricia tree, Tiger hash tree, or other cryptographic structure. In FIG. 3, $H_k$ 302 may be a hash that corresponds to a data unit whose certification is being verified. Cryptographic structure 300 may be reconstructed based on an index included in a proof that corresponds to the data unit being verified. The index may describe positions of hashes including $H_k$ 302, $H_L$ 304, $H_{IJ}$ 306, $H_{MNOP}$ 308, and $H_{ABCDEFGH}$ 310 among other hashes 312 in the tree/structure. As shown in FIG. 3, hashing (the various arrows in FIG. 3 representing hashing) a hash 314 of hashes 316, 308, 306, 318, 320, and 322 when $H_k$ 302 is in its expected position 324 relative to hashes 312 in the tree/structure may result in Root 318 ($H_{ABCDEFGHIJKLMNOP}$). If a verification hash of the data unit whose certification is being verified does not place $H_k$ 302 in expected position 324, $H_k$ may not be part of Root 318 and the data unit's certification may not be verified.

Returning to FIG. 1, in some implementations, server(s) 102, computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, computing platform(s) 104, and/or external resources 130 may be operatively linked via some other communication media.

A given computing platform 104 may include one or more processors configured to execute machine-readable instructions. The machine-readable instructions may be configured to enable an expert or user associated with the given computing platform 104 to interface with system 100 and/or external resources 130, and/or provide other functionality attributed herein to computing platform(s) 104. By way of non-limiting example, the given computing platform 104 may include one or more of a desktop computer, a laptop computer, a handheld computer, a tablet computing platform, a NetBook, a Smartphone, a gaming console, and/or other computing platforms.

External resources 130 may include sources of information, hosts and/or providers of block chain or distributed ledger environments outside of system 100, external entities participating with system 100, and/or other resources. In some implementations, some or all of the functionality attributed herein to external resources 130 may be provided by resources included in system 100.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134 (e.g., the hashes described above), information received from server(s) 102, information received from computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. The processor(s) 134 may be configured to execute machine-readable instruction components 108, 110, 112, 114, 116, 118, 120, 122, 124, 126, 128, and/or other machine-readable instruction components. Processor(s) 134 may be configured to execute machine-readable instruction components 108, 110, 112, 114, 116, 118, 120, 122, 124, 126, 128, and/or other machine-readable instruction components by software;

hardware; firmware; some combination of software, hardware, and/or firmware; and/or other mechanisms for configuring processing capabilities on processor(s) 134. As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

It should be appreciated that although machine-readable instruction components 108, 110, 112, 114, 116, 118, 120, 122, 124, 126, and 128 are illustrated in FIG. 1 as being implemented within a single processing unit, in implementations in which processor(s) 134 includes multiple processing units, one or more of machine-readable instruction components 108, 110, 112, 114, 116, 118, 120, 122, 124, 126, and/or 128 may be implemented remotely from the other machine-readable instruction components. The description of the functionality provided by the different machine-readable instruction components 108, 110, 112, 114, 116, 118, 120, 122, 124, 126, and/or 128 described herein is for illustrative purposes, and is not intended to be limiting, as any of machine-readable instruction components 108, 110, 112, 114, 116, 118, 120, 122, 124, 126, and/or 128 may provide more or less functionality than is described. For example, one or more of machine-readable instruction components 108, 110, 112, 114, 116, 118, 120, 122, 124, 126, and/or 128 may be eliminated, and some or all of its functionality may be provided by other ones of machine-readable instruction components 108, 110, 112, 114, 116, 118, 120, 122, 124, 126, and/or 128. As another example, processor(s) 134 may be configured to execute one or more additional machine-readable instruction components that may perform some or all of the functionality attributed below to one of machine-readable instruction components 108, 110, 112, 114, 116, 118, 120, 122, 124, 126, and/or 128.

Figure 4:
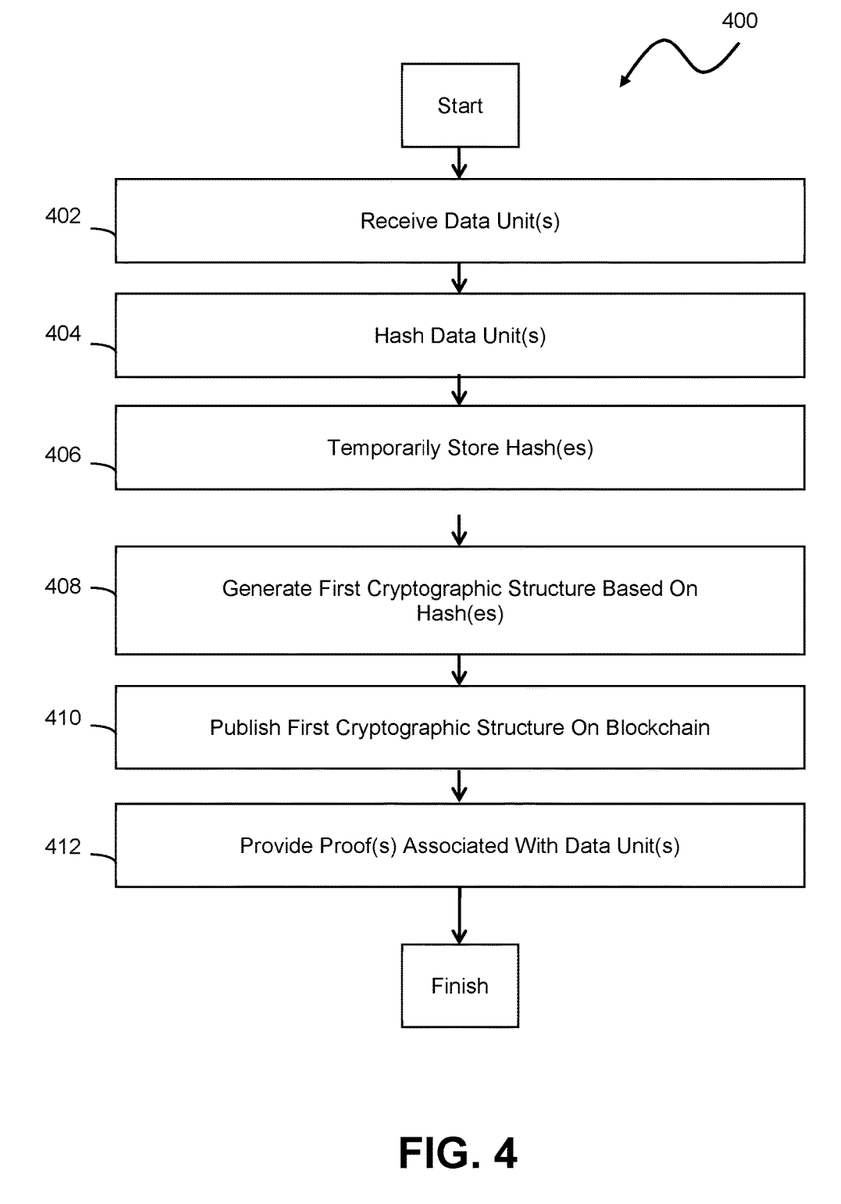
FIG. 4 illustrates a method for using a block chain to certify the existence, integrity, and/or ownership of a file or communication, in accordance with one or more implementations.

FIG. 4 illustrates a method 400 for using a block chain or distributed ledger to certify the existence, integrity, and/or ownership of a file or communication, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, one or more operations of method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a plurality of data units may be received. The plurality of data units may be received during a first timeframe and/or at other times. The plurality of data units may include a first data unit and/or other data units. Operation 402 may be performed by one or more hardware processors configured to execute a machine-readable instruction component that is the same as or similar to stamping data unit component 108 (as described in connection with FIG. 1), in accordance with one or more implementations.

At an operation 404, individual ones of the plurality of data units may be hashed. Hashing individual ones of the plurality of data units may provide a plurality of hashes. The first data unit may be hashed using a first hash algorithm and/or other algorithms to provide a first hash. The first hash may be a unique cryptographic identifier of the first data such that the first hash verifiably relates to the first data and the first hash cannot be used by itself to obtain the first data. Operation 404 may be performed by one or more hardware processors configured to execute a machine-readable instruction component that is the same as or similar to stamping hash component 110 (as described in connection with FIG. 1), in accordance with one or more implementations.

At an operation 406, the plurality of hashes may be temporarily stored. The plurality of hashes may be stored until occurrence of a trigger event and/or for other periods of time. A trigger event may include expiration of a predetermined period of time (e.g., 10 minutes), creation of a new block in connection with the block chain or distributed ledger, receipt of a predetermined number of data units, and/or other events. Operation 406 may be performed by one or more hardware processors configured to execute a machine-readable instruction component that is the same as or similar to stamping storage component 112 (as described in connection with FIG. 1), in accordance with one or more implementations.

At an operation 408, a first cryptographic structure may be generated based on the plurality of hashes and/or other information. The first cryptographic structure may be generated based on the plurality of hashes responsive to occurrence of a trigger event (e.g., expiration of a predetermined period of time, creation of a new block in connection with the block chain or distributed ledger, receipt of a predetermined number of data units) and/or at other times. In some implementations, the first cryptographic structure may be associated with any number (e.g., one data unit, two data units, tens of data units, hundreds of data units, thousands of data units, millions of data units, billions of data units, etc.) of data units. In some implementations, generating the first cryptographic structure based on the plurality of hashes may comprise hashing the plurality of hashes until a single hash that is a hash of the plurality of hashes is generated. In some implementations, the first cryptographic structure may include a Merkle tree, a Patricia tree, a Tiger hash tree, and/or other cryptographic structures. Operation 408 may be performed by one or more hardware processors configured to execute a machine-readable instruction component that is the same as or similar to stamping cryptographic structure component 114 (as described in connection with FIG. 1), in accordance with one or more implementations.

At an operation 410, the first cryptographic structure may be published on the block chain or distributed ledger. In some implementations, the first cryptographic structure may comprise up to 80 bytes of data, and publishing the first cryptographic structure on the block chain or distributed ledger may comprise embedding the up to 80 bytes of data into the block chain or distributed ledger. In some implementations, the block chain may be a Bitcoin block chain, and the first cryptographic structure may be published on the block chain using an OP_RETURN feature of Bitcoin. Operation 410 may be performed by one or more hardware processors configured to execute a machine-readable instruction component that is the same as or similar to stamping publication component 116 (as described in connection with FIG. 1), in accordance with one or more implementations.

At an operation 412, proofs associated with individual ones of the plurality of data units may be provided. The proofs may include a first proof associated with the first data unit. The first proof may allow independent verification that the first data unit is certified. Operation 412 may be performed by one or more hardware processors configured to execute a machine-readable instruction component that is the same as or similar to stamping proof component 118 (as described in connection with FIG. 1), in accordance with one or more implementations.

Figure 5:
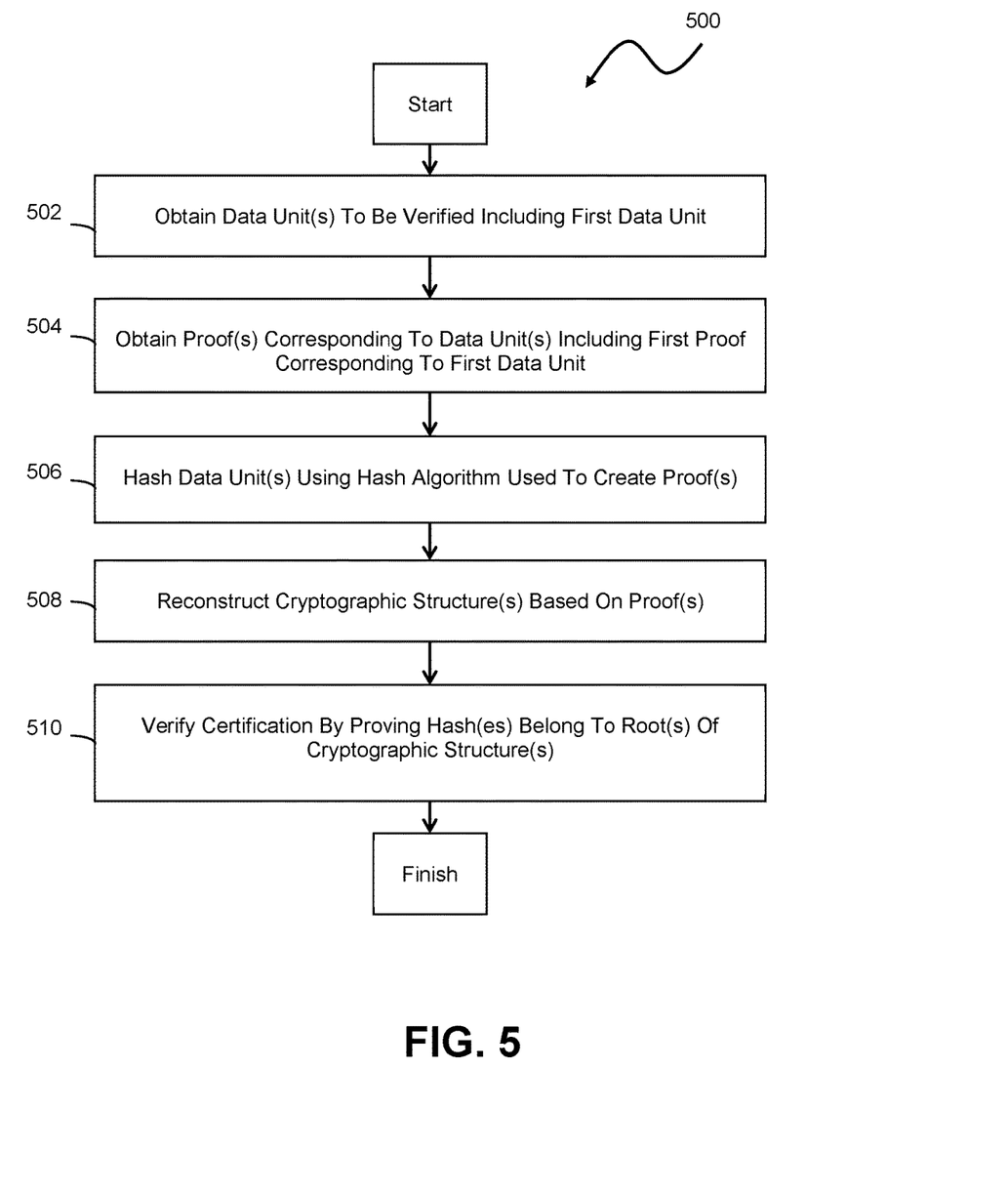
FIG. 5 illustrates a method for using a block chain to verify certification of data units such as files or communications, in accordance with one or more implementations.

FIG. 5 illustrates a method 500 for using a block chain or distributed ledger to verify certification of data units such as files or communications, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, one or more operations of method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, one or more data units to be verified may be obtained. The data units may include a first data unit to be verified and/or other data units. Operation 502 may be performed by one or more hardware processors configured to execute a machine-readable instruction component that is the same as or similar to verification data unit component 120 (as described in connection with FIG. 1), in accordance with one or more implementations.

At an operation 504, one or more proofs corresponding to the one or more data units may be obtained. The proofs may include a first proof corresponding to the first data unit and/or other proofs. Operation 504 may be performed by one or more hardware processors configured to execute a machine-readable instruction component that is the same as or similar to verification proof component 124 (as described in connection with FIG. 1), in accordance with one or more implementations.

At an operation 506, the one or more data units may be hashed using a hashing algorithm used to create the one or more proofs. The first data unit may be hashed using a first hash algorithm to create a first hash. The first proof may include an index describing a position of the first hash among other hashes in a first cryptographic structure published on the block chain or distributed ledger. Operation 506 may be performed by one or more hardware processors configured to execute a machine-readable instruction component that is the same as or similar to verification hash component 122 (as described in connection with FIG. 1), in accordance with one or more implementations.

At an operation 508, cryptographic structures may be reconstructed based on the one or more proofs. The first cryptographic structure may be reconstructed based on the index of the first proof and/or other information. In some implementations, reconstructing cryptographic structures based on the one or more proofs may comprise reconstructing a Merkle tree, a Patricia tree, a Tiger hash tree, or other cryptographic structure. The reconstructed tree/structure may describe the position of the first hash among other hashes in the first cryptographic structure published on the block chain or distributed ledger. In some implementations, the first proof may list the other hashes and the first hash, and the other hashes and the first hash may be used to reconstruct the tree/structure. Operation 508 may be performed by one or more hardware processors configured to execute a machine-readable instruction component that is the same as or similar to verification cryptographic structure component 126 (as described in connection with FIG. 1), in accordance with one or more implementations.

At an operation 510, certification may be verified by proving that hashes belong to roots of the cryptographic structures. Certification of the first data unit may be verified by proving that the first hash belongs to a root of the first cryptographic structure. In some implementations, the first proof may include a Bitcoin transaction identification in which the root of the first cryptographic structure was published. Operation 510 may be performed by one or more hardware processors configured to execute a machine-readable instruction component that is the same as or similar to root verification component 128 (as described in connection with FIG. 1), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating certification of data units and verification thereof, the system comprising:
   one or more processors configured by machine-readable instructions to:
   receive one or more data units, the one or more data units including a first data unit;
   hash one or more data units to generate one or more hashes, the first data unit being hashed using a first hash algorithm to provide a first hash, the first hash being a unique cryptographic identifier of the first data unit;
   generate a first cryptographic structure based on the one or more hashes;
   publish the first cryptographic structure on a block chain or distributed ledger; and
   provide one or more proofs associated with the one or more data units, the one or more proofs including a first proof associated with the first data unit, the first proof allowing independent verification that the first data unit is certified;

obtain the first data unit as a data unit that is to be verified; and responsive to obtaining the first data unit:
hash the first data unit using the first hash algorithm;
obtain the first proof associated with the first data unit, the first proof including an index describing a position of the first hash among one or more other hashes in the first cryptographic structure published on the block chain or distributed ledger;
reconstruct the first cryptographic structure based on the index of the first proof; and
verify certification of the first data unit by proving that the first hash belongs to a root of the first cryptographic structure.

2. The system of claim 1, wherein the one or more data units comprise at least one million data units, and the first cryptographic structure is associated with the at least one million data units.

3. The system of claim 1, wherein the one or more data units comprise a plurality of data units, and wherein generating the first cryptographic structure comprises hashing the plurality of data units to generate a hash of the plurality of hashes.

4. The system of claim 1, wherein the one or more data units comprise at least one million data units, and the first cryptographic structure is associated with the at least one million data units, and wherein generating the first cryptographic structure comprises hashing the at least one million data units to generate a hash of the at least one million data units.

5. The system of claim 1, wherein the first cryptographic structure comprises a Merkle tree.

6. The system of claim 1, wherein the first cryptographic structure comprises a Patricia tree or a Tiger hash tree.

7. The system of claim 1, wherein reconstructing the first cryptographic structure comprises reconstructing a Merkle tree based on the first proof.

8. The system of claim 7, wherein the reconstructed Merkle tree describes the position of the first hash among the one or more other hashes in the first cryptographic structure published on the block chain or distributed ledger.

9. The system of claim 7, wherein the first proof lists the first hash and the one or more other hashes, and reconstructing the first cryptographic structure comprises reconstructing the Merkle tree based on the first hash and the one or more other hashes.

10. The system of claim 1, wherein reconstructing the first cryptographic structure reconstructing a Patricia tree or a Tiger hash tree based on the first proof.

11. The system of claim 1, wherein the block chain or distributed ledger is a Bitcoin block chain, and wherein the first cryptographic structure is published on the Bitcoin block chain using an OP_RETURN feature of Bitcoin.

12. The system of claim 1, wherein the first proof includes a Bitcoin transaction identification in which the root of the first cryptographic structure was published.

13. The system of claim 1, wherein the block chain or distributed ledger is an Ethereum block chain.

14. The system of claim 13, wherein publishing the first cryptographic structure comprises publishing the first cryptographic structure on the Ethereum block chain via the data field feature of Ethereum.

15. The system of claim 13, wherein publishing the first cryptographic structure comprises publishing the first cryptographic structure on the Ethereum block chain via the contract creation feature of Ethereum.

16. The system of claim 1, wherein the block chain or distributed ledger is a private block chain or distributed ledger.

17. The system of claim 1, wherein the block chain or distributed ledger is based on a digital token.

18. A method for facilitating certification of data units and verification thereof, the method being performed by one or more processors configured by machine-readable instructions, the method comprising:
receiving one or more data units, the one or more data units including a first data unit;
hashing one or more data units to generate one or more hashes, the first data unit being hashed using a first hash algorithm to provide a first hash, the first hash being a unique cryptographic identifier of the first data unit;
generating a first cryptographic structure based on the one or more hashes;
publishing the first cryptographic structure on a block chain or distributed ledger;
providing one or more proofs associated with the one or more data units, the one or more proofs including a first proof associated with the first data unit, the first proof allowing independent verification that the first data unit is certified;
obtaining the first data unit as a data unit that is to be verified; and
responsive to obtaining the first data unit:
hashing the first data unit using the first hash algorithm;
obtaining the first proof associated with the first data unit, the first proof including an index describing a position of the first hash among one or more other hashes in the first cryptographic structure published on the block chain or distributed ledger;
reconstructing the first cryptographic structure based on the index of the first proof; and
verifying certification of the first data unit by proving that the first hash belongs to a root of the first cryptographic structure.

19. The method of claim 18, wherein reconstructing the first cryptographic structure comprises reconstructing a Merkle tree, a Patricia tree, or a Tiger hash tree based on the first proof.

20. The method of claim 18, wherein the block chain or distributed ledger is a Bitcoin block chain, an Ethereum block chain, or a private block chain or distributed ledger.

* * * * *